(12) United States Patent
Zhang et al.

(10) Patent No.: US 6,767,965 B2
(45) Date of Patent: Jul. 27, 2004

(54) METHOD OF PREPARING MONOMER-GRAFTED SYNDIOTACTIC POLYSTYRENE WITH POLARITY

(75) Inventors: Xuequan Zhang, Taejeon (KR); Jae Gon Lim, Taejeon (KR); Jung Hyun Baik, Taegu (KR); Hyun Joon Kim, Taejeon (KR)

(73) Assignee: Samsung Atofina Co. Ltd. (KR)

( * ) Notice: Subject to any disclaimer, the term of this patent is extended or adjusted under 35 U.S.C. 154(b) by 0 days.

(21) Appl. No.: 10/297,119

(22) PCT Filed: May 30, 2001

(86) PCT No.: PCT/KR01/00905

§ 371 (c)(1),
(2), (4) Date: Jan. 10, 2003

(87) PCT Pub. No.: WO01/92352

PCT Pub. Date: Dec. 6, 2001

(65) Prior Publication Data

US 2003/0158346 A1 Aug. 21, 2003

(30) Foreign Application Priority Data

Jun. 2, 2000 (KR) ........................................ 2000-30420

(51) Int. Cl.[7] ........................ C08L 25/06; C08F 257/02
(52) U.S. Cl. .............................. 525/84; 525/71; 525/69; 525/241; 525/263; 525/285; 524/504; 524/505
(58) Field of Search .............................. 525/845, 71, 69, 525/241, 263, 285, 84, 93; 524/504, 505

(56) References Cited

U.S. PATENT DOCUMENTS 4,687,814 A * 8/1987 Chaumont et al. .......... 525/242
5,760,105 A 6/1998 Okada et al. ............... 523/201
6,048,932 A * 4/2000 Okada et al. ................ 525/68

FOREIGN PATENT DOCUMENTS

| EP | 0 420 134 A2 | 4/1991 |
|---|---|---|
| EP | 0 490 269 A1 | 6/1992 |
| JP | 3 126 743 | 5/1991 |
| KR | 95 29 287 | 11/1995 |
| KR | 99 30 925 | 5/1999 |

OTHER PUBLICATIONS

Chandrasiri, J.A. et al., "Chemically Initiated Graft Copolymeriztion of Acrylic Acid onto Acrylonitrile–Butadiene–Styrene (ABS) Terpolymer and Its Constituent Polymers", *Journal of Polymer. Science, Part A: Polymer Chemistry,* 1996, 34, 1113–1120.

Ishihara, N. et al., "Crystalline Syndiotactic Polystyrene", *Macromolecules,* 1986, 19, 2464–2465.

Xue, T.J. et al., "Graft Coploymerization of Acrylonitrile onto Polystyrene", *Journal of. Polymer. Science. Part A: Polymer Chemistry,* 1997, 35, 1275–1282.

* cited by examiner

*Primary Examiner*—James J. Seidleck
*Assistant Examiner*—Olga Asinovsky
(74) *Attorney, Agent, or Firm*—Woodcock Washburn LLP

(57) ABSTRACT

The present invention provides a method of preparing a monomer-grafted syndiotactic polystyrene with polarity, which comprises (a) forming swollen syndiotactic polystyrene by mixing with a syndiotactic polystyrene in powder state and a radical initiator in a solvent at the temperature of 40–80° C. using a batch reactor, and (b) grafting a monomer selected from the group consisting of maleic anhydride, maleic imide and derivatives thereof onto the swollen syndiotactic polystyrene.

21 Claims, 2 Drawing Sheets

METHOD OF PREPARING MONOMER-GRAFTED SYNDIOTACTIC POLYSTYRENE WITH POLARITY

FIELD OF THE INVENTION

Figure 1:
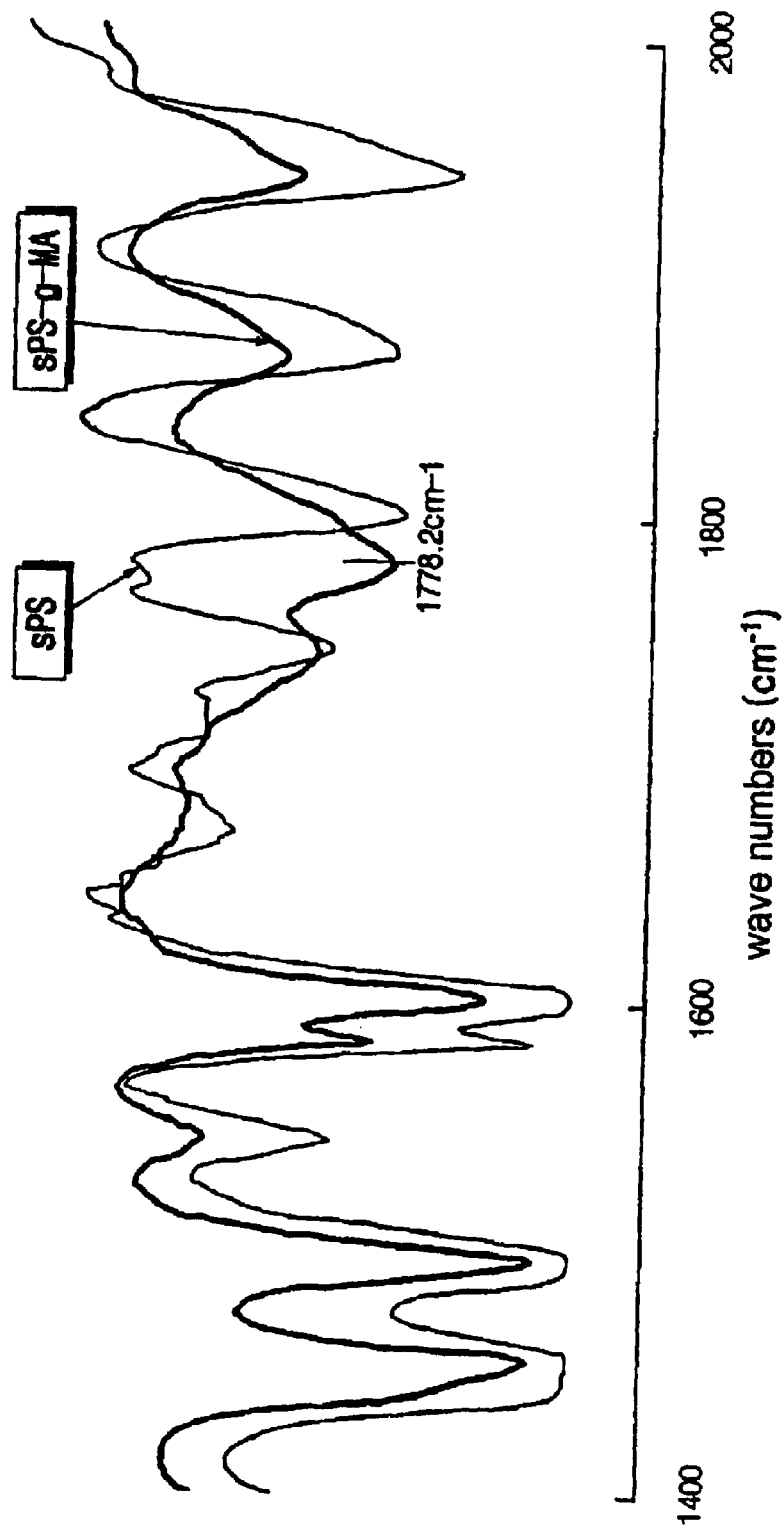

The present invention relates to a method of preparing a modified syndiotactic polystyrene with polarity by modifying syndiotactic polystyrene with non-polarity with a monomer component with polarity. More particularly, the present invention relates to a method of preparing a modified syndiotactic polystyrene with polarity by swelling syndiotactic polystyrene with non-polarity in a batch reactor and grafting monomers having a polar group such as maleic anhydride onto the swollen syndiotactic polystyrene.

BACKGROUND OF THE INVENTION

Syndiotactic polystyrene (sPS) was first synthesized in 1985, using a homogeneous organometallic catalytic system based on a titanium compound and methylaluminoxane (N. Ishihara, T. Seimiya, M. Kuramoto and M. Uoi, Macromolecules 1986, 19, 2465).

Syndiotactic polystyrene has low specific gravity, low dielectric constant, high modulus of elasticity and excellent resistance to chemicals. Accordingly the syndiotactic polystyrene has become a promising engineering plastic material for various applications in the electronic and packaging industries. However, syndiotactic polystyrene has disadvantageously low compatibility with other polymers, poor adhesive strength with a metal component and low impact strength. In order to solve these problems, there has been proposed methods of polarizing syndiotactic polystyrene itself or copolymerizing sPS with a polymer having a polar group.

The method of modifying by polarizing atactic polystyrene have been studied for a long time, and there are many research reports on this subject. Modified copolymers such as acrylonitrile/butadiene/styrene (ABS) or styrene/butadiene/styrene (SBS) by the use of radical can be prepared by graft copolymerization, especially in butadiene region of the polymer (J. A. Chandrasiri and C. A. Wilkie, J. Polym. Sci. Part A: polymer Chem., 1996, 34, 1113).

Xue and Wilkie discloses that the graft-copolymerization of acrylonitrile onto polystyrene by a radical process cannot occur, because the methine hydrogen may not be removed by radicals (T. J. Xue and C A. Wilkie, J. Polym. Sci. Part A: polymer Chem., 1997, 35, 1275). In addition, the solution process does not permit successful graft copolymerization due to its low productivity and complexity of the solvent post-treating process. Furthermore, modification reaction cannot occur in a solution state (T. J. Xue and C A. Wilkie, J. Polym. Sci. Part A: polymer Chem., 1997, 35, 1275).

Atactic polystyrenes which exhibit no stereoregularity can not produce any efficient blend without use of a styrenic copolymer such as SBS, SEBS, SIS or SEP. For instance, styrene-co-maleic anhydride (SMA), which is a copolymer of atactic polystyrene with maleic anhydride, has poor processability at high temperature since maleic anhydride is copolymerized irregularly with the main chain of polystyrene. Any research on modifying syndiotactic polystyrene processed at high temperature has not been conducted sufficiently.

Idemitsu Kosan Company of Japan proves that 3 mol % and more of alkyl styrene such as methyl styrene leads to a graft copolymerization (U.S. Pat. No. 5,760,105). However, the study of directly copolymerizing syndiotactic polystyrene with maleic anhydride has not obtained satisfactory results yet, since it employs syndiotactic poly(styrene-methylstyrene) copolymer as a stating material, which requires a further polymerization step.

Until now, there have been no experiments or results about introduction of a polar group such as maleic anhydride to syndiotactic polystyrene directly. Therefore, the present inventors have developed the method of introducing a polar group such as maleic anhydride to syndiotactic polystyrene directly.

In general, methods of introduction of maleic anhydride to polyolefin or a copolymer such as ABS and SEBS are known well, for example, a solution process, which comprises preparing a solution of starting polymer with a certain solvent and introducing a polar group into the solution. However, this method gives rise to difficulty in applying to syndiotactic polystyrene. That is, solvent for dissolving syndiotactic polystyrene has a high boiling point, which causes difficulty in process control and solvent post-treating process, resulting in disadvantages in large-scale production.

Accordingly, the present inventors have developed a method for preparing a modified syndiotactic polystyrene with polarity by use of syndiotactic polystyrene in the form of powder as a staring material in a batch process instead of a solution process and by using a slurry process in which the starting material is swelled with solvent.

OBJECTS OF THE INVENTION

It is an object of the present invention to provide a novel method of preparing a modified syndiotactic polystyrene using syndiotactic polystyrene in the form of powder compared to a conventional method using atactic polystyrene.

It is another object of the present invention to provide a method of preparing a modified syndiotactic polystyrene having good compatibility with other materials, which is characterized by slurrying syndiotactic polystyrene in the form of powder to induce graft polymerization.

It is still another object of the present invention to provide a method of preparing a modified syndiotactic polystyrene having good impact strength.

It is still another object of the present invention to provide a method of preparing a modified syndiotactic polystyrene without limitation of the scope of this application.

It is still another object of the present invention to provide a method of preparing a modified syndiotactic polystyrene which is easy for handling and prevents deterioration and oxidation by conducting the reaction in a slurry state by use of syndiotactic polystyrene as a starting material at low temperature.

It is still another object of the present invention to provide a method of preparing a modified syndiotactic polystyrene which can rule out circumstantial effects such as a temperature.

It is still another object of the present invention to provide a method of preparing a modified syndiotactic polystyrene without deterioration of properties such as thermal property by conducting the graft reaction in an amorphous section of syndiotactic polystyrene after forming swollen syndiotactic polystyrene.

The above and other objects and advantages of this invention will be apparent from the ensuing disclosure and appended claims.

BRIEF DESCRIPTION OF THE INVENTION

Figure 2:
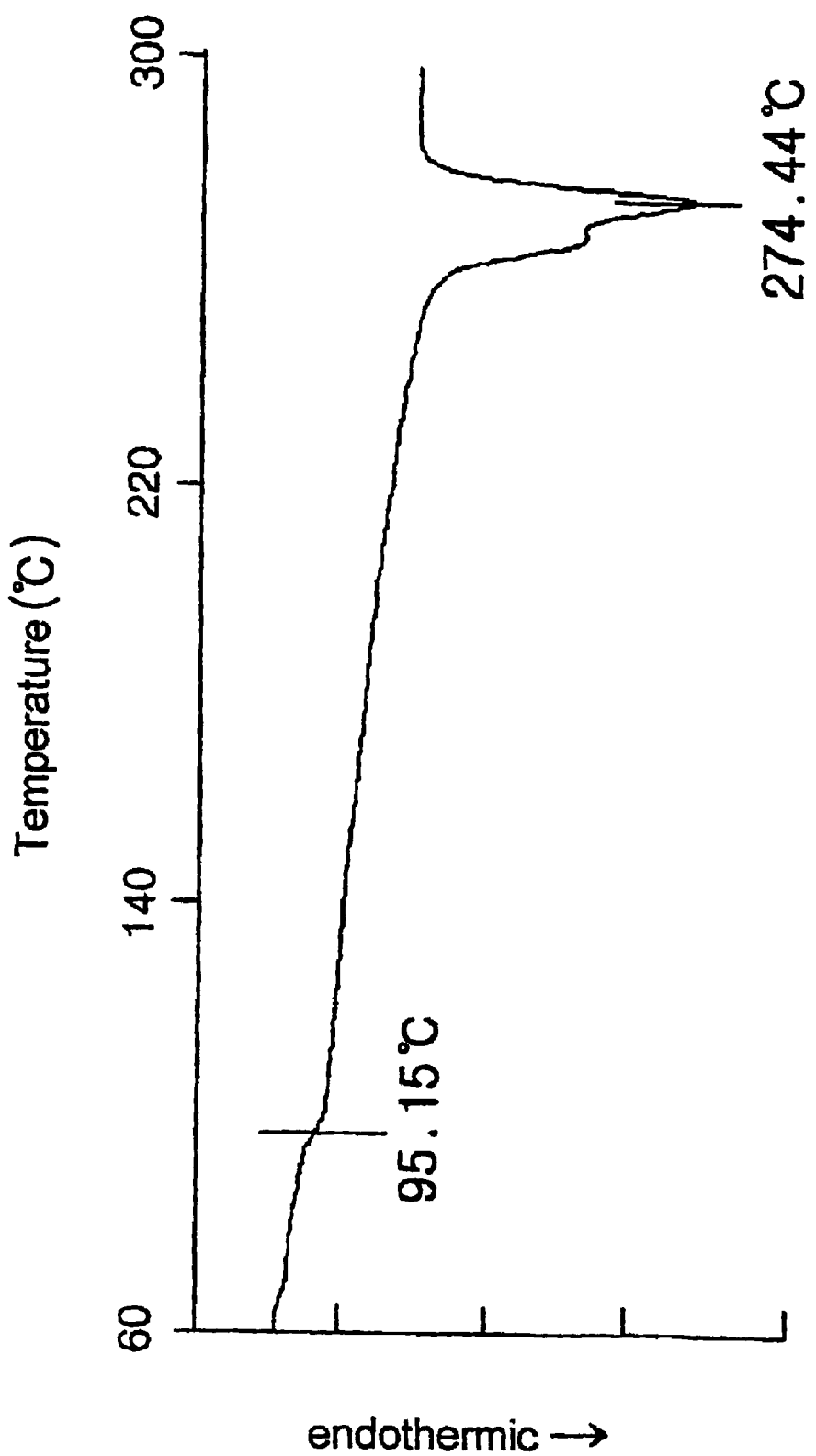

FIG. 1 is an infrared (IR) absorption spectrum of syndiotactic polystyrenes prepared by a conventional method and a method of the present invention, respectively; and FIG. 2 is a differential scanning calorimeter (DSC) of syndiotactic polystyrene prepared in accordance with a method of the present invention.

DETAILED DESCRIPTION OF THE DRAWINGS

The method of preparing a modified syndiotactic polystyrene with polarity of the present invention comprises providing a slurry of syndiotactic polystyrene in the form of powder and modifying the syndiotactic polystyrene with a monomer having a polar group to induce graft copolymerization. Since the syndiotactic polystyrene in the form of powder is used as a starting material and reacted by a slurry process, it is allowed to proceed at lower temperature than any other processes, which provides a simple operation and can minimize deterioration and oxidation of syndiotactic polystyrene. Further, it can rule out circumstantial effects such as temperature on the monomer to be used.

The method of preparing a modified syndiotactic polystyrene with polarity comprises (a) providing swollen syndiotactic polystyrene by mixing syndiotactic polystyrene in the form of powder with a radical initiator in a solvent at a proper temperature in a batch reactor, and (b) graft-polymerizing the swollen syndiotactic polystyrene with a monomer having a polar group such as maleic anhydride.

The syndiotactic polystyrene of the present invention is represented by the following formula with a tacticity of 97% or more, which is determined by NMR:

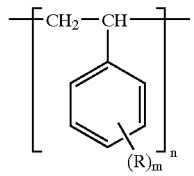

where R is individually selected from the group consisting of a hydrogen, a halogen, a carbon, an oxygen, a nitrogen, a sulfur, a phosphorus atom and a silicon atom; m represents an integer of 1 to 3; and n is a degree of polymerization which represents an integer of larger than 5. The benzene rings of the syndiotactic polystyrene are alternatively positioned in each side.

In general, syndiotactic polystyrene is polymerized by a catalytic system consisting of a metallocene catalyst and a cocatalyst. The metallocene catalyst has a structure in which the ancillary ligand of a transition metal compound and the functional group of a reacting compound are bonded together. There are many types of metallocene, depending upon transition metal compound, reacting compound having at least two functional groups, and molar ratio of the compounds.

The syndiotactic polystyrene (sPS) used in the present invention is a polystyrene having 97% or more of syndiotacticity, which is prepared by polymerization to regulate morphology of the product polymer.

To a reactor, syndiotactic polystyrene is added followed by purging with nitrogen in order to remove water.

To the purged syndiotactic polystyrene, an organic solvent and an initiator are added followed by stirring for 1–2 hours, maintaining the temperature of 40–80° C.

The preferable example of the organic solvent is toluene. The initiator of the present invention includes 2,2'-azobis isobutylonitrile, dicumyl peroxide, benzoyl peroxide and t-butylperbenzoate. The amount of initiator of the present invention can be easily measured by an ordinary skilled person in the art.

In this step, the syndiotactic polystyrene becomes a swollen state. Since the reaction proceeds after the syndiotactic polystyrene in the form of powder are transformed into the form of swollen state in a solvent, the graft polymerization carry out in the amorphous section of syndiotactic polystyrene.

The swollen syndiotactic polystyrene reacts with a monomer having a polar group such as maleic anhydride. The solution is heated to 90–130° C., followed by adding monomers to be grafted, and then stirring for 20–50 minutes intensively. The stirring speed should be about 200–500 rpm. The monomers of the present invention have a polar group and can be represented by any of the following formula:

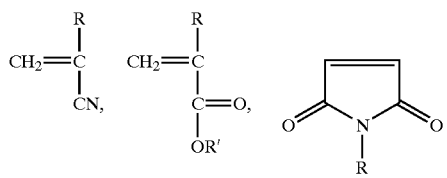

where R and R' independently represents an aliphatic or aromatic group.

The preferable examples of the monomers of the present invention include maleic anhydride and derivates thereof, and maleic imide or derivates thereof. The monomers are graft-copolymerized with a part of the syndiotactic polystyrene to obtain a modified syndiotactic polystyrene with polarity.

The reaction product is washed with a solvent A conventional organic solvent, preferably toluene or acetone, can be used as a solvent. More preferably, toluene is used for the first solvent and acetone for the second. The washing step can be accomplished by using the conventional method such as filtration or solvent extraction.

The filtered product is dried under vacuum at 100–150° C. to obtain final product. Other drying method using hot nitrogen or steam can be used instead of the vacuum drying.

Since the graft copolymerization in the present invention mainly carries out in the amorphous section of the syndiotactic polystyrene, the modified syndiotactic polystyrene can be prepared without deterioration of mechanical properties such as heat resistance.

In addition, the modified syndiotactic polystyrene in accordance with the present invention has good compatibility with other materials and high impact strength in comparison with conventional syndiotactic polystyrenes, thereby overcoming the limitation of the scope of this application.

The invention may be better understood by reference to the following examples which are intended for the purpose of illustration and are not to be construed as in any way limiting the scope of the present invention, which is defined in the claims appended hereto.

EXAMPLES 1–4

To a glass reactor syndiotactic polystyrene powder was added and then purged with nitrogen The syndiotactic polystyrene (sPS) used in the Examples was a polystyrene with a syndiotacticity of 97% or more, which is prepared by polymerization in an experimental glass reactor to regulate morphology of the product polymer. Then, dicumyl peroxide (DCP) as solvent and initiator (AIBN) were added followed by stirring for 2 hours, maintaining the temperature at 60° C. Then the solution was heated to 110° C., followed by adding monomer and maleic anhydride to be grafted, stirring intensively for 40 minutes. The reaction product was washed with toluene for the fist time and then with acetone for the second The filtered product was dried in vacuum drier at 130° C. to obtain a modified syndiotactic polystyrene with polarity. The amounts of syndiotactic polystyrene (sPS), monomers, maleic anhydride, solvent (DCP) and initiator (AIBN) used in the Examples, and the monomer contents of the modified syndiotactic polystyrene (MsPS) are shown in Table 1.

TABLE 1

| Examples | sPS (g) | MA (g) | DCP (g) | AIBN (g) | Reaction temperature (° C.) | MA Cont. (wt %) |
|---|---|---|---|---|---|---|
| 1 | 1000 | 500 | 30 | 0 | 70 | 1.09 |
| 2 | 1000 | 500 | 30 | 0 | 100 | 1.57 |
| 3 | 1000 | 500 | 0 | 30 | 70 | 0.11 |
| 4 | 1000 | 500 | 0 | 30 | 100 | 0.20 |

The results of analysis of syndiotactic polystyrenes prepared by the Examples of the present invention are shown in FIG. 1. FIG. 1 is an infrared (IR) spectroscopy of syndiotactic polystyrenes prepared by a conventional method and by a method of the present invention, respectively. The characteristics of the modified syndiotactic polystyrene of the present invention in comparison with the conventional one can be determined by the infrared (IR) spectroscopy. In order to confirm the presence of the intrinsic chemical structure of the maleic anhydride, it is necessary to extract the sample for 8 hours using MEK (methyl ethyl ketone). Thereby the unreacted maleic anhydride was removed.

The following structure shows a peak at 1780 cm$^{-1}$. It can be seen that maleic anhydride monomer is bonded to syndiotactic polystyrene.

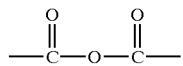

FIG. 2 is a differential scanning calorimeter (DSC) of syndiotactic polystyrene prepared by the method of present invention. The result of the DSC was the same as conventional syndiotactic polystyrene having 97.6° C. of glass transition temperature and 274.4° C. of melting temperature as shown in FIG. 2.

The determination of the amount of polar group in the above modified syndiotactic polystyrene is carried out by means of the same FT-IR spectroscopy in the independent experiment to obtain a measuring curve by the following method, which comprises: preparing respective maleic anhydride-polystyrene solutions depending on the concentration of maleic anhydride by dissolving in solvent such as tetrahydrofurane (THF) and analyzing these solutions using FT-IR regarding to the concentration of maleic anhydride in polystyrene to obtain the peak intensity of maleic anhydride.

The present invention can be easily carried out by an ordinary skilled person in the art. Many modifications and changes may be deemed to be with the scope of the present invention as defined in the following claims.

What is claimed is:

1. A method of preparing a modified syndiotactic polystyrene with polarity, comprising the steps of:
   (a) providing a slurry of swollen syndiotactic polystyrene by mixing a syndiotactic polystyrene powder with a radical initiator in an organic solvent;
   (b) adding a monomer comprising a polar group to said slurry to graft-polymerize said swollen syndiotactic polystyrene with a said monomer at a temperature of between 70° C. and 130° C. to form said modified syndiotactic polystyrene.

2. The method as claimed in claim 1, wherein said step (a) for providing a slurry of swollen syndiotactic polystyrene step is carried out by stirring for 1–2 hours at a temperature of between 40° C. and 80° C.

3. The method as claimed in claim 1, wherein said syndiotactic polystyrene is represented by the following formula with a tacticity of 97% or more:

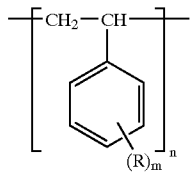

where R is individually selected from the group consisting of a hydrogen, a halogen, a carbon, an oxygen, a nitrogen, a sulfur, a phosphorus atom and silicon atom, m represents an integer of 1 to 3, n is integer of 5 or larger, representing degree of polymerization, and the benzene rings are alternatively positioned in each side.

4. The method as claimed in claim 1, which further comprises purging said modified syndiotactic polystyrene with nitrogen to remove water.

5. The method as claimed in claim 1, wherein said initiator is selected from the group consisting of 2,2'-azobis isobutylonitrile, dicumyl peroxide, benzoyl peroxide and t-butylperbenzoate.

6. The method as claimed in claim 1, comprising elevating said slurry temperature to 90–130° C., followed by adding said monomers to said slurry to form a graft-polymerization mixture, and further comprising stirring said graft-polymerization mixture for 20–50 minutes intensively at a rate of 200–500 rpm.

7. The method as claimed in claim 1, wherein said polar group is selected from the group consisting of:

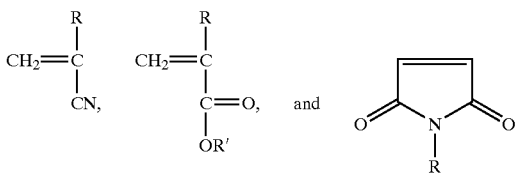

where R and R' independently represent an aliphatic or aromatic group.

8. The method as claimed in claim 7, wherein said monomer is selected from the group consisting of maleic anhydride, maleic anhydride derivatives, maleic imide, maleic imide derivatives, and combinations thereof.

9. The method as claimed in claim 1, which further comprises washing the modified syndiotactic polystyrene with a solvent after graft-polymerization.

10. The method as claimed in claim 9, which further comprises drying the washed modified syndiotactic polystyrene under vacuum at 100–150° C.

11. A modified syndiotactic polystyrene prepared by the method as defined in claim 1.

12. A modified syndiotactic polystyrene prepared by the method as defined in claim 2.

13. A modified syndiotactic polystyrene prepared by the method as defined in claim 3.

14. A modified syndiotactic polystyrene prepared by the method as defined in claim 4.

15. A modified syndiotactic polystyrene prepared by the method as defined in claim 5.

16. A modified syndiotactic polystyrene prepared by the method as defined in claim 6.

17. A modified syndiotactic polystyrene prepared by the method as defined in claim 7.

18. A modified syndiotactic polystyrene prepared by the method as defined in claim 8.

19. A modified syndiotactic polystyrene prepared by the method as defined in claim 9.

20. A modified syndiotactic polystyrene prepared by the method as defined in claim 10.

21. The method as claimed in claim 1, wherein said step (a) for adding a monomer comprising a polar group to said slurry is carried out at a temperature of between 90° C. and 130° C.

* * * * *